US012684013B1

(12) United States Patent　　　　　(10) Patent No.:　US 12,684,013 B1

Uppal et al.　　　　　　　　　　　　(45) Date of Patent:　　　Jul. 14, 2026

(54) MITIGATING DENIAL OF SERVICE ATTACKS BY LEVERAGING GEOGRAPHICAL LOCATIONS OF NETWORK EDGES

(71) Applicant: Amazon Technologies, Inc., Seattle, WA (US)

(72) Inventors: Hardeep Singh Uppal, Seattle, WA (US); Matthew Delaney, Portland, OR (US); Akshat Aranya, Portland, OR (US); Thomas Bradley Scholl, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 384 days.

(21) Appl. No.: 18/129,553

(22) Filed: Mar. 31, 2023

(51) Int. Cl.
　　　*H04L 9/40*　　　　　(2022.01)
(52) U.S. Cl.
　　　CPC ...... *H04L 63/1458* (2013.01); *H04L 63/1416* (2013.01); *H04L 2463/146* (2013.01)
(58) Field of Classification Search
　　　CPC ............. H04L 63/1458; H04L 63/1416; H04L 2463/146
　　　See application file for complete search history.

(56) References Cited

U.S. PATENT DOCUMENTS 11,128,695 B1 *　9/2021　Wragg ................. H04L 12/4633
2009/0262741 A1 *　10/2009　Jungck ................ H04L 41/5054
　　　　　　　　　　　　　　　　　　　　　　370/392

2011/0214177 A1 *　9/2011　Spatscheck ......... H04L 63/1458
　　　　　　　　　　　　　　　　　　　　　　726/22
2014/0153422 A1 *　6/2014　Nambiar ................. H04L 47/28
　　　　　　　　　　　　　　　　　　　　　　370/252
2015/0074286 A1 *　3/2015　Anschutz ................ H04L 45/38
　　　　　　　　　　　　　　　　　　　　　　709/240
2018/0034889 A1 *　2/2018　Rubenstein ......... H04L 63/0281
2018/0109553 A1 *　4/2018　Radlein ............... H04L 63/1458
2020/0412760 A1 *　12/2020　Luo ...................... H04L 63/1458
2022/0321479 A1 *　10/2022　Calder .................. H04L 47/125
2023/0099967 A1 *　3/2023　Stalioraitis ............. H04L 47/25
　　　　　　　　　　　　　　　　　　　　　　709/223

* cited by examiner

*Primary Examiner* — Daniel B Potratz
*Assistant Examiner* — Matthias Habtegeorgis
(74) *Attorney, Agent, or Firm* — Klarquist Sparkman, LLP

(57)　　　　　　　ABSTRACT

A system analyzes network traffic at the network edge in a Point-of-Presence (POP) to prevent denial of service attacks, such a reflection attack, and filters such attack traffic. The POP can analyze a source identifier of the network traffic, such as a source prefix, and compare the source identifier to known source identifiers from the same geographic region as the POP. If the source identifier is outside of the POPs geographic region, then the network traffic is rate limited, such as by blocking the network traffic or reducing the network traffic to a desired threshold. To further ensure that the traffic is routed to the appropriate POP, the POP edge location announces anycast addresses for receiving the network traffic. The geographic region can be defined as a city, a country, sub-regions within a country, a portion of a continent (e.g., southeast region of Asia), a continent, etc.

20 Claims, 6 Drawing Sheets

RECEIVE NETWORK TRAFFIC IN A POP — 510

COMPARE A SOURCE ID OF THE NETWORK TRAFFIC WITH KNOWN SOURCE IDENTIFIERS IN A SAME GEOGRAPHIC REGION AS THE POP — 520

DETERMINE THAT THE SOURCE IDENTIFIER DOES NOT MATCH ONE OF THE KNOWN SOURCE IDENTIFIERS — 530

IDENTIFYING THE NETWORK TRAFFIC AS A DoS ATTACK AND RATE LIMITING THE NETWORK TRAFFIC — 540

MITIGATING DENIAL OF SERVICE ATTACKS BY LEVERAGING GEOGRAPHICAL LOCATIONS OF NETWORK EDGES

BACKGROUND

In a denial-of-service attack (DoS), a perpetrator attempts to disrupt a network resource, typically by flooding the network resource with superfluous requests to overload the network resource and prevent legitimate requests from being fulfilled. In a distributed denial-of-service attack (DDoS), the incoming malicious traffic originates from multiple different sources. One of the most common DDoS attacks leverages publicly reachable services to generate a reflection attack (e.g., SYN-ACK flood, DNS request flood, etc.) against an entity using a single or a distributed source of attacks. These sources generate large volumes of traffic towards these publicly reachable distributed services with high capacity knowing that such services would respond to this attack traffic. Such attack sources spoof the entity being attacked by creating reflections, wherein the response traffic from these public services is reflected back to the spoofed IP address causing the attack to land on the service the attackers intend to disrupt. Because the reflection is sourced from known public entities, the reflected traffic is usually trusted by most firewalls and, therefore, lands on the entity being attacked causing capacity constraints on that entity.

DETAILED DESCRIPTION

Reflection attacks are a common form of DoS attack wherein requests of some type are sent to one or more computers that reply to the requests. The source address used is the targeted victim, which means all replies are sent to the target to flood or overload the target. To prevent such a reflection attack and filter such attack traffic, the system described herein analyzes network traffic at the network edge in a Point-of-Presence (POP). The POP can analyze a source identifier of the network traffic, such as a source prefix or an address, and compare the source identifier to known source identifiers from the same geographic region as the POP. If the source identifier is outside of the POPs geographic region, then the network traffic is rate limited, such as by blocking the network traffic or reducing the network traffic to a desired threshold. To further ensure that the traffic is routed to the appropriate POP, the POP edge location announces anycast addresses for receiving the network traffic.

Figure 1:
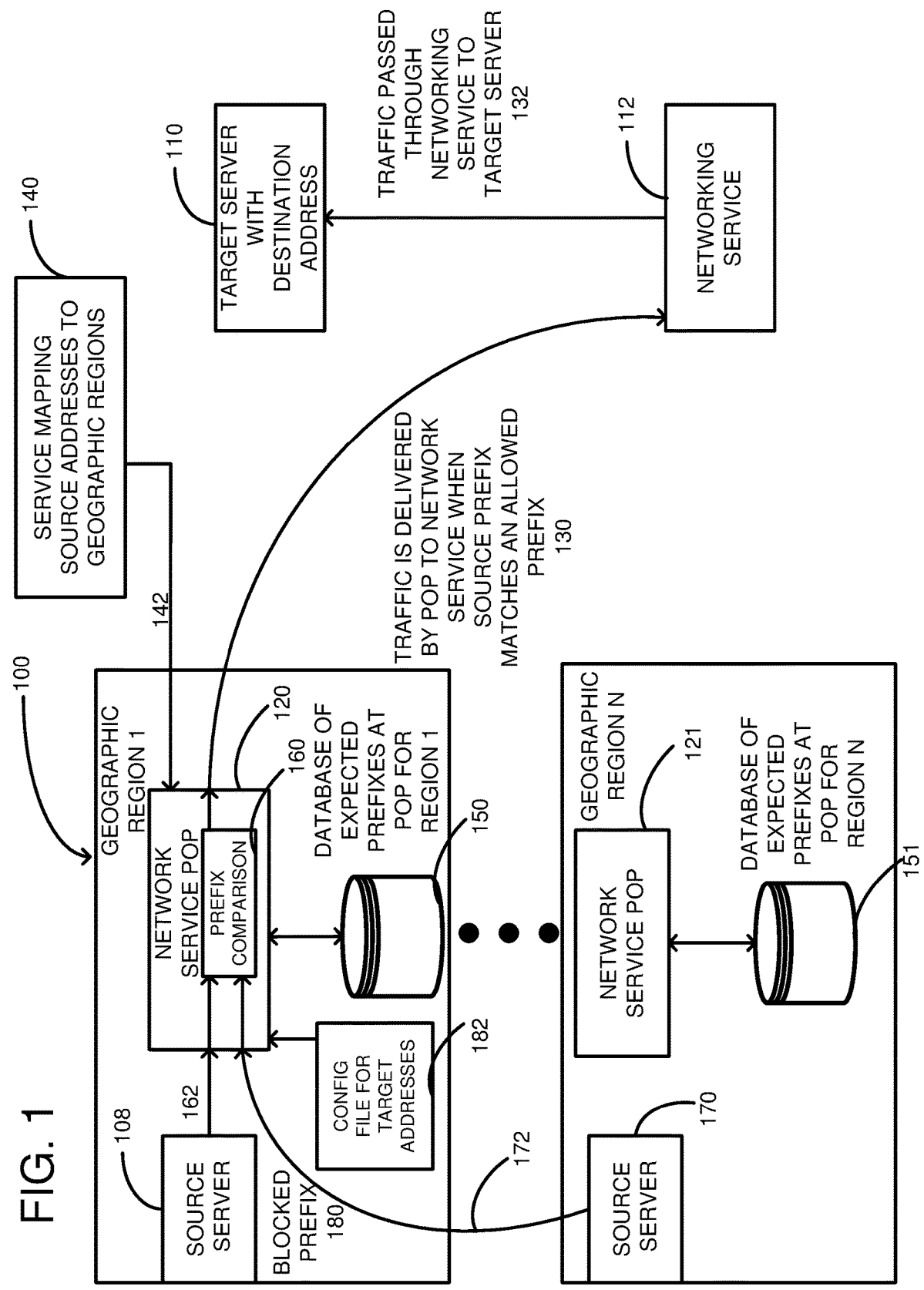
FIG. 1 is a system diagram of network including multiple Point-of-Presence (POPs) edge locations in different geographic regions.

FIG. 1 is a system 100 for forwarding network traffic from a source device, such as source 108, to a target server 110. A networking service 112 can be used to forward the networking traffic. The networking service 112 can be a content distribution network (CDN), which is a geographically distributed network of proxy servers and data centers that provide a variety of services, such as video streaming, software downloads, web and mobile content acceleration, caching at POP locations, load balancing, etc. In the case of accelerators, the networking service can provide global static IP addresses that act as a fixed entry point to application endpoints, such as network load balancers, application load balancers, and other features of a compute service provider environment. The networking service 112 is associated with a plurality of POPs 120, 121, each within different geographic regions 1 through N, where N is any integer number. The geographic region can be defined as a city, a country, sub-regions within a country, a portion of a continent (e.g., southeast region of Asia), a continent, etc. The geographic region can also be defined by a distance between a source server computer and the POP. The distance can be a physical distance or a networking distance (based upon latency of packet travel). The geographic region can also be defined in hierarchical tiers, wherein the networking distance is a top tier that is considered first, then a physical distance can be a second tier, and then country, etc. can be yet a different tier. Additionally, the rate limits can depend upon which tier is being used. Typically, the rate limits become stricter or more limiting as the distance is increased. Each POP is a network edge location that announces anycast addresses for receiving network traffic. When the network traffic is received, the POP forwards the network traffic, as shown at 130, to the networking service 112. The networking service 112 can then transmit the network traffic, as shown at 132, to the target server 110 associated with a destination address of the network traffic.

Figure 3:
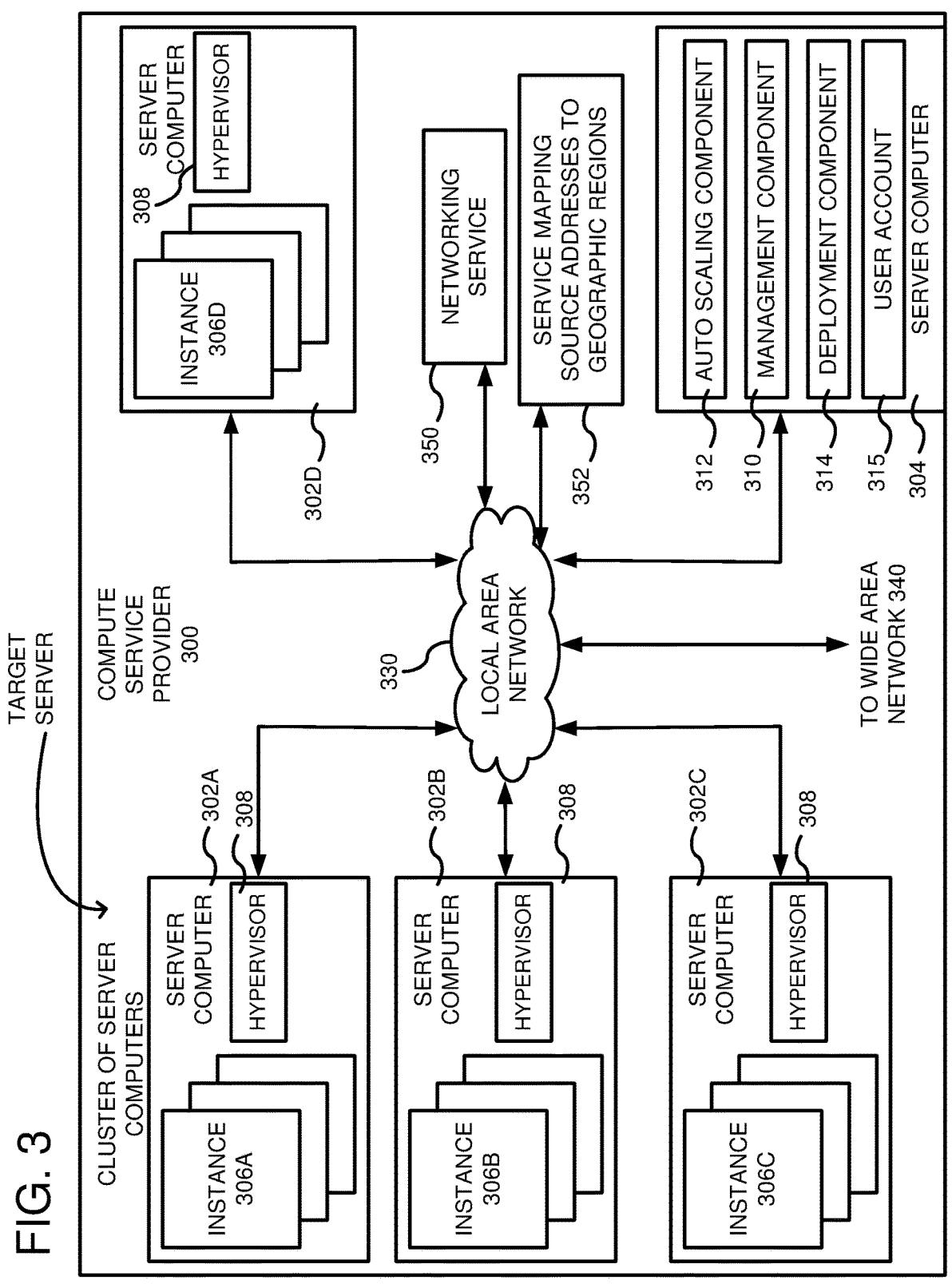
FIG. 3 is an example system diagram showing a plurality of virtual machine instances running in the multi-tenant environment with a networking service used in conjunction with the POPs of FIG. 1.

A service 140 collects historical data as part of a compute service provider environment (described further in FIG. 3). The historical data includes source IP addresses and which geographic regions receive traffic from the source IP addresses. The source IP addresses can be a prefix rather than a full IP address. The historical data can be obtained based upon a geo-IP database or based upon actual data passing through a compute service provider network. For example, compute service providers can obtain the historical data based on round-trip times for packets, relationships with third-party Internet Service Providers (ISPs), etc. The association between the IP addresses and the geographic regions can be transmitted to the POP 120, such as is shown by arrow 142. This history data can then be stored in a database 150 within the geographic region 1 or within the POP 120 that is within the geographic region 1. A source server computer 108 uses the previously broadcasted anycast addresses to transmit data to the POP 120, which is the closest POP available to the source 108. The POP 120 uses prefix comparison logic 160 to compare a prefix associated with network traffic 162 received from the source server 108 to prefixes stored in the database 150. If a match is found, then the prefix is confirmed to be historically trusted and from the geographic region 1. Accordingly, the network traffic 130 is transmitted onto the networking service 112.

By contrast, a source server 170 is outside of the geographic region 1 and transmits network traffic 172 to the POP 120. The prefix comparison logic 160 compares the prefix associated with the network traffic 172 to the prefixes stored in the database 150 and no match is found. Accordingly, the POP 120 identifies the network traffic 172 as a DoS attack and rate limits the network traffic 172, such as by blocking the network traffic, as indicated at 180. The degree of rate limiting can be controlled by a configuration file 182, which includes configuration data supplied by users of the networking service 112, such as an entity associated with the target server 110. In this way, the entity associated with the destinations of network traffic can customize rate limiting at POP edge locations associated with the networking service 112. Additionally, such an entity can apply different rate limits to different destination addresses and different rate limits for different geographic POP edge locations. The configuration file 182 can also include data supplied from the networking service 112, which can control rate limiting at the POP locations 120, 121.

It should be noted that each geographic region 1–N stores its own expected source addresses. Consequently, historical data of prefixes stored in database 150 typically differ from the historical data of prefixes stored in a database 151 in geographic region N. Additionally, although described as applying to anycast routing, the system can also apply unicast routing. Still further, the system can apply to Domain Name System (DNS) based content delivery networks. The routing of the network traffic through the POP 120 can be performed in a router, a load balancer, a web server, etc. Thus, different routing technologies can be used to implement the routing of network traffic through the POP 120. Additionally, the network traffic 162, 172 can be transmitted using any desired protocol, such as a Transmission Control Protocol (TCP), a User Datagram Protocol (UDP), or an Internet Control Message Protocol (ICMP). Other protocols can be used.

Figure 2:
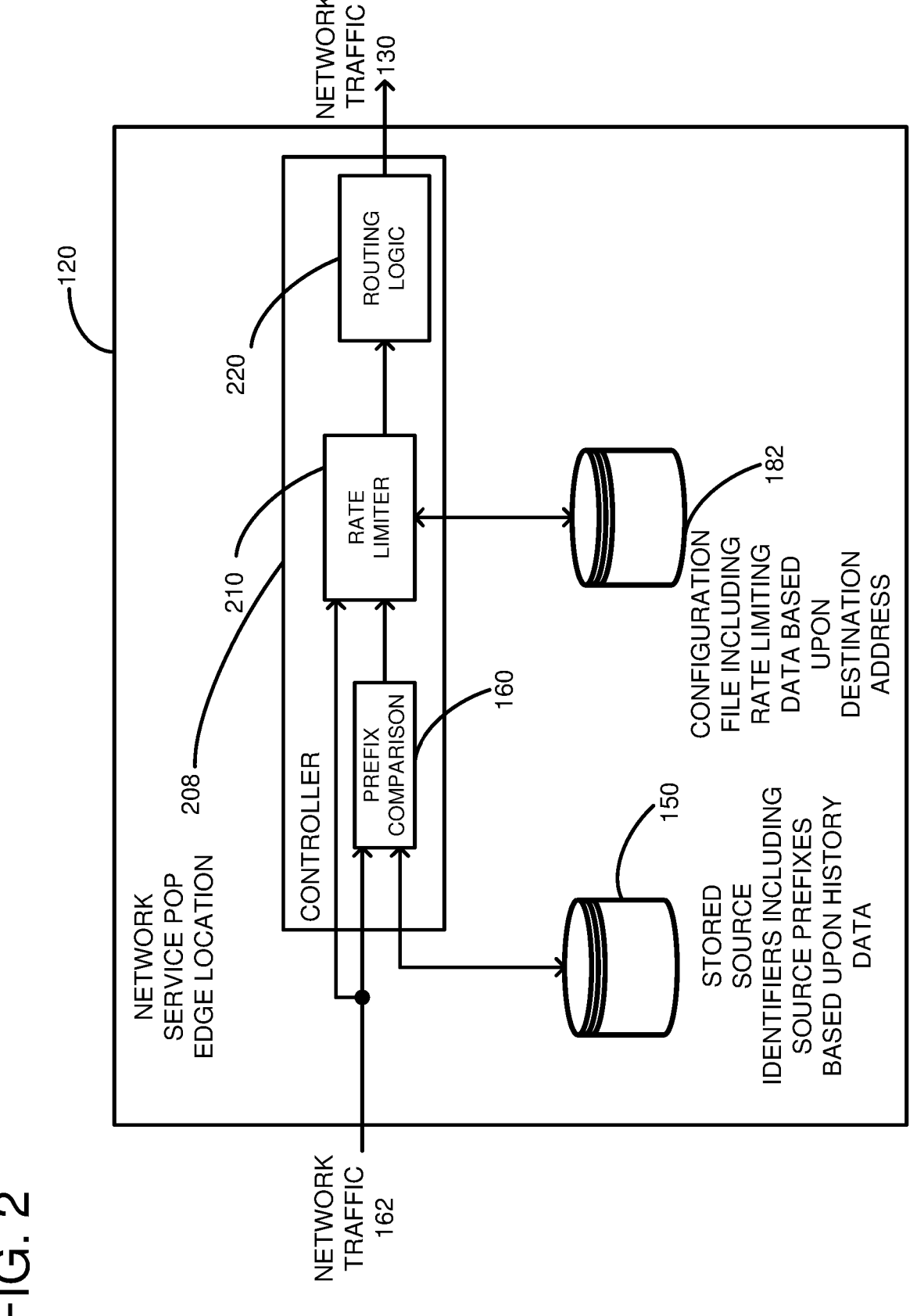
FIG. 2 shows further details of the POP of FIG. 1 including rate limiting logic within the POP edge location.

FIG. 2 shows the POP 120 in more detail. The network traffic 162 is received by the POP 120 and enters a controller 208. The controller 208 can be a general-purpose central processing unit (CPU), processor in an application-specific integrated circuit (ASIC) or any other type of processor. The controller can further be a router, a load balancer, a web server, etc., as described above. The controller 208 can include the prefix comparison logic 160 and rate limiter logic 210. The network traffic 162 enters the controller 208 in the prefix comparison logic 160, which parses the packets of the network traffic 162 to determine a source prefix found in the header of the packets. The prefix comparison logic 160 then performs a lookup trying to match the source prefix against prefixes found in the database 150. If a match is found, then the prefix comparison logic 160 outputs a signal to the rate limiter logic 210 indicating that the prefix comparison passed. If, however, the prefix comparison logic 160 cannot find a matching source prefix in the database 150, then it outputs a failing signal to the rate limiter logic 210. The rate limiter logic 210 performs a lookup using a destination address of the network traffic in the database 182. The database 182 includes a plurality of destination addresses and associated rate limitations depending on whether the prefix comparison logic 180 passed or failed its lookup. For example, each different destination address can be associated with a different rate limiting parameter, which is used by the rate limiting logic 210 to control the transmission rate of the network traffic. The rate limiter logic 210 also directly receives the network traffic 162 and can selectively restrict a transmission rate of the network traffic 130 output from the controller 208. In some cases, if the prefix comparison fails, the rate limiter logic 210 can block the network traffic altogether that is associated with the failing source prefix. Alternatively, if the prefix comparison fails, the rate limiter logic 210 can limit the transmission rate to any designated threshold. If the comparison passes, then a default rate limit can be applied, which can be different from the rate limit used if the comparison fails. Thus, a first rate limit can be used if the comparison passes, and a different, more restrictive (lower), second rate limit can be used if the comparison fails. FIG. 2 shows an alternative embodiment to FIG. 1 in that the databases 150, 182 are shown within the POP 120 instead of outside of the POP. The rate limiter 210 is coupled to routing logic 220, which determines how to route the traffic to a next hop in the network. Generally, the routing logic 220 receives the network traffic on one of multiple ports and outputs the network traffic on a different port based upon forwarding rules, routing policies, etc. The routing logic 220 can also be a router, fire wall, load balancer, etc.

FIG. 3 is a computing system diagram of a network-based compute service provider 300 that illustrates on environment in which embodiments described herein can be used. By way of background, the compute service provider 300 (i.e., the cloud provider) is capable of delivery of computing and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of customers operate independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service (s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e. a computer) that executes applications like a physical machine. In the example of virtual machine, each of the servers 302A-302D can be configured to execute a hypervisor 308 or another type of program configured to enable the execution of multiple instances 306 on a single server. Additionally, each of the instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 can be reserved for executing software components for managing the operation of the server computers 302 and the instances 306. For example, the server computer 304 can execute a management component 310. A customer can access the management component 310 to configure various aspects of the operation of the instances 306 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 312 can scale the instances 306 based upon rules defined by the customer. In one embodiment, the auto scaling component 312 allows a customer to specify scale-up rules for use in determining when new instances should be instantiated and scale-down rules for use in determining when existing instances should be terminated.

The auto scaling component 312 can consist of a number of subcomponents executing on different server computers 302 or other computing devices. The auto scaling component 312 can monitor available computing resources over an internal management network and modify resources available based on need.

A deployment component 314 can be used to assist customers in the deployment of new instances 306 of computing resources. The deployment component can have access to account information associated with the instances, such as who is the owner of the account, credit card information, country of the owner, etc. The deployment component 314 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the customer-provided configuration and cache logic to configure, prime, and launch new instances 306. The configuration, cache logic, and other information may be specified by a customer using the management component 310 or by providing this information directly to the deployment component 314. The instance manager can be considered part of the deployment component.

User account information 315 can include any desired information associated with a customer of the multi-tenant environment. For example, the user account information can include a unique identifier for a customer, a customer address, billing information, licensing information, customization parameters for launching instances, scheduling information, auto-scaling parameters, previous IP addresses used to access the account, etc. The user account information 315 can also include rate limiting data used in the configuration file 182 (FIG. 1) for various destination addresses associated with the user account. Thus, the user can control (rate limit or block) network traffic at a POP network edge location by including configuration information into the user account 315. Such information can be used to populate the configuration file 182 for use in the POP 120. By allowing the user to control network traffic at the POP network edge location, the user can directly control DDoS attacks against instances 306 operating in the compute service provider environment.

A network 330 can be utilized to interconnect the server computers 302A-302D and the server computer 304. The network 330 can be a local area network (LAN) and can be connected to a Wide Area Network (WAN) 340 so that end customers can access the compute service provider 300. It should be appreciated that the network topology illustrated in FIG. 3 has been simplified and that many more networks and networking devices can be utilized to interconnect the various computing systems disclosed herein.

A networking service 350 can execute on a server computer in the compute service provider environment 300. The networking service 350 can be a service such as a CDN. The networking service 350 can have static IP addresses that are used to access the service. Additionally, the networking service 350 can forward network traffic received to target instances 306 executing within the compute service provider 300. A service 352 mapping source addresses to geographic regions can also execute on a server computer within the compute service provider 300. The service 352 can obtain historical data of network traffic and confirm the geographic region from which the network traffic arrived. The historical data can be determined using round trip delays of packet data to determine the appropriate geographic region. Accordingly, the service 352 can function like the service 140 in FIG. 1.

Figure 4:
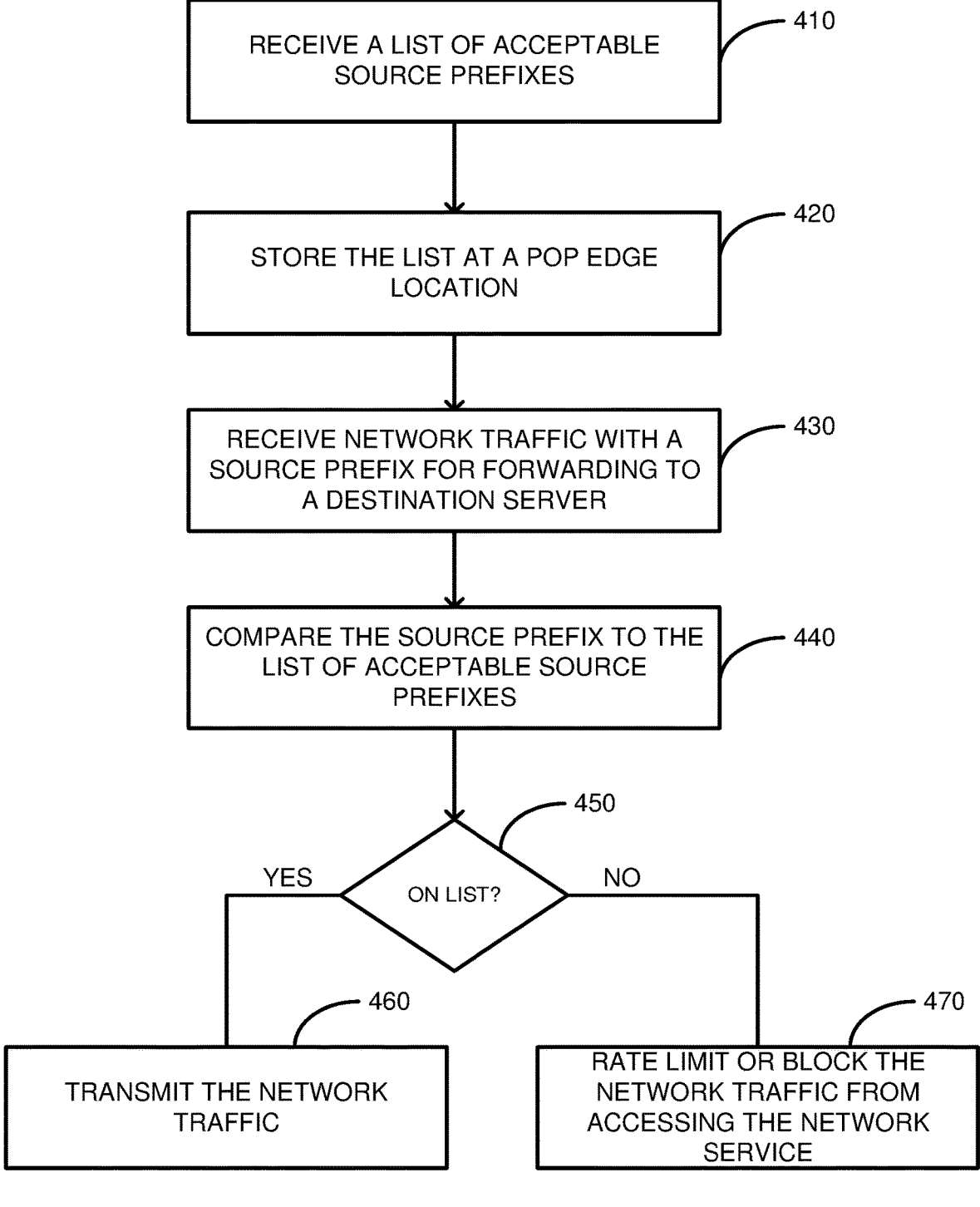
FIG. 4 is a flowchart according to one embodiment for rate limiting network traffic at the POP of FIG. 1.

FIG. 4 is a flowchart according to one embodiment of mitigating a DoS attack. In process block 410, a list of acceptable source prefixes is received. For example, in FIG. 1, the network service POP 120 can receive a list of source prefixes from the service 140. In process block 420, the list is stored at a POP edge location (geographic region 1). The list can be stored locally at or near the POP in database 150. For example, FIG. 1 shows the database 150 external to the POP but within the same geographic region 1, while FIG. 2 shows the database 150 within the POP 120. In process block 430, network traffic is received with a source prefix for forwarding to a destination server. The source prefix is found in a header of network packets and can be parsed from a network packet for comparison. Some source prefixes can be valid and others can be spoofed source prefixes used in a DoS attack on a target server computer. Typically, it is found that network traffic having source prefixes not within the same geographic region as the POP are more likely to be a DoS attack. For example, a perpetrator of a DoS attack is often associated with a country from which many attacks originate. Consequently, the perpetrator attempts to divert traffic through a POP associated with a geographic region that is historically safer to reduce suspicion. In process block 440, a comparison is performed wherein the source prefix from the network traffic is used as a key to search the list of acceptable source prefixes. For example, in FIG. 2, the prefix comparison logic 160 uses the source prefix in the network traffic 162 for an established communication session and uses the source prefix as a key in searching within database 150. In decision block 450, if a match is found, then in process block 460, the network traffic is transmitted. The transmitted network traffic can be with a default rate limit (based on POP capacity or target capacity), or it can be transmitted without any rate limit. For example, in FIG. 1, the network traffic 162 is allowed to pass through the POP 120 and is delivered (as shown at 130) to the networking service 112, which can then pass the network traffic to the target or destination address 110. Otherwise, in process block 470, the network traffic is rate limited or blocked. For example, in FIG. 1, the source server 170 is not within the same geographic region as the POP 120. As a result, the network traffic 172 is determined to be a DoS attack. In FIG. 2, the rate limiting logic 210 can then limit or block the network traffic 172 in accordance with the configuration file 182. Thus, source identifiers, such as prefixes, that originate outside of the geographic region of the POP can be identified and rate limited as being a potential DoS attack.

Figure 5:
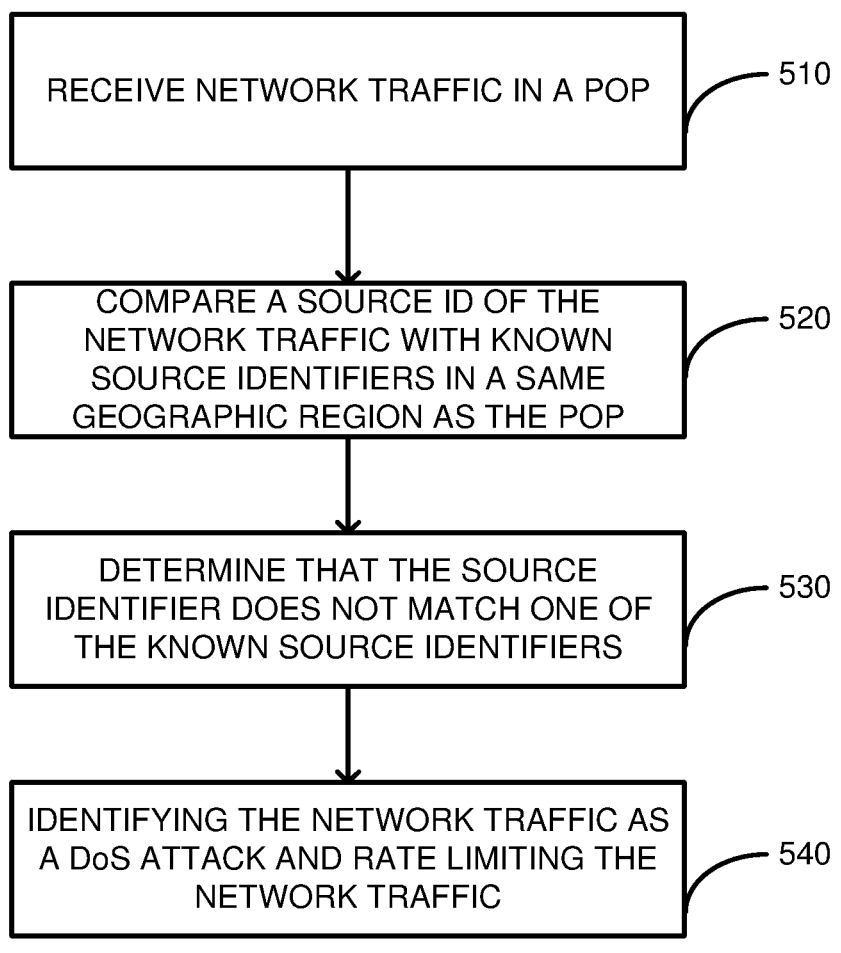
FIG. 5 is a flowchart according to another embodiment for rate limiting network traffic at the POP of FIG. 1.

FIG. 5 is a flowchart according to another embodiment for detecting a DoS attack. In process block 510, network traffic is received at the POP. For example, in FIG. 2, network traffic 172 is received at POP 120. In process block 520, a source identifier of the received network traffic is compared with known source identifiers. For example, the source identifiers can be source IP addresses or prefixes. The known source identifiers relate to source identifiers associated with the same geographic region as the POP. In process block 530, a determination is made that the source identifier in the received network traffic does not match known source identifiers. For example, in FIG. 1, network traffic 172 received from source server computer 170, which is in a different geographic region than the POP 120, can be determined to be a non-matching source identifier. In process block 540, because the source identifier does not match known identifiers, the network traffic is identified as a DoS attack. Consequently, rate limiting (e.g., blocking or reducing) the network traffic can be implemented. For example, in FIG. 2, the rate limiter 210 can be used to rate limit network traffic if the prefix comparison logic 160 determines that the network traffic is a DoS attack.

Figure 6:
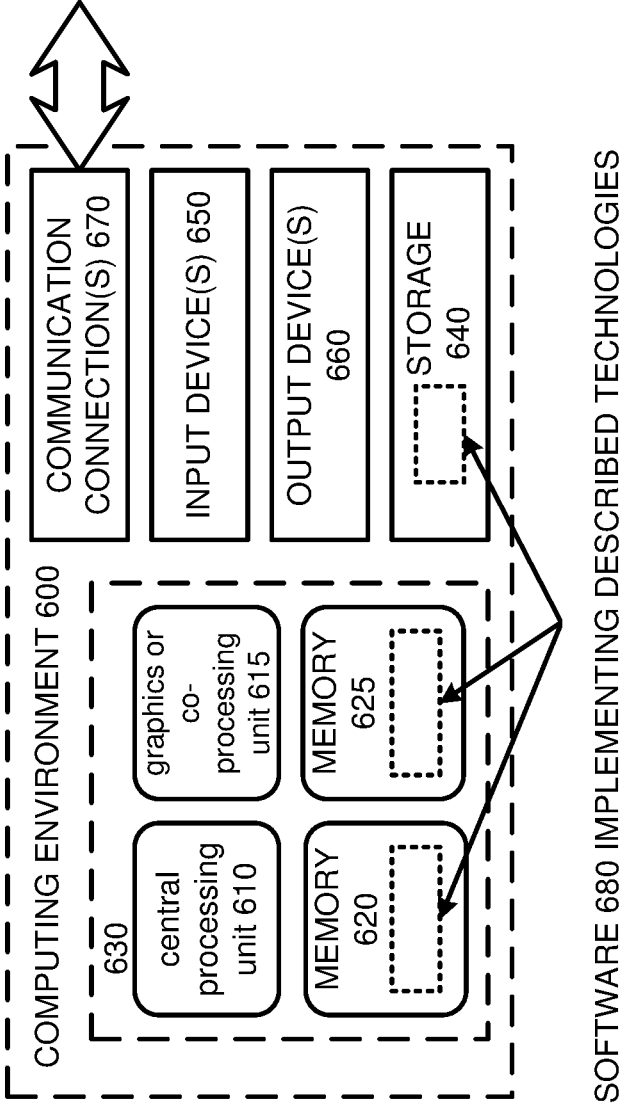
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). In one example, the computing environment 600 can be used as the controller 208 of FIG. 2.

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of identifying and mitigating a distributed denial of service (DDoS) attack, the method comprising:

receiving a list of acceptable source prefixes of content providers in a Point-of-Presence (POP) edge location of a network, wherein the acceptable source prefixes are based upon a history of source prefixes being received within a same geographic region as the POP edge location;

storing the list of the acceptable source prefixes, of content providers, at the POP edge location for analysis of network traffic propagating through the POP edge location;

receiving network traffic with a source prefix of a content provider for forwarding to a destination server computer through a networking service;

comparing the source prefix to the list of acceptable source prefixes;

if the source prefix is not on the list of acceptable source prefixes, which are associated with the same geographic region as the POP edge location, rate limiting the network traffic from accessing the networking service; and if the source prefix is on the list of acceptable source prefixes, transmitting the network traffic to the networking service without rate limiting for forwarding to the destination server computer.

2. The method of claim 1, wherein the POP edge location announces anycast addresses for receiving network traffic.

3. The method of claim 1, wherein the rate limiting includes blocking the network traffic.

4. The method of claim 3, wherein the same geographic region is one of the following: a same city, a same country, a same group of countries, a same continent or a latency-based distance between a source computer associated with the source prefix and the POP.

5. The method of claim 1, further including storing a configuration file associated with the destination server computer and retrieving the rate limiting from the configuration file.

6. The method of claim 1, wherein the receiving of the network traffic is accomplished using Transmission Control Protocol (TCP), User Datagram Protocol (UDP), or Internet Control Message Protocol (ICMP).

7. A method, comprising:

receiving network traffic in a Point-of-Presence (POP) edge location of a network, wherein the POP is in a geographic region;

comparing a source identifier of the network traffic to known source identifiers within a same geographic region as the POP;

determining that the source identifier does not match one of the known source identifiers for the geographic region in which the POP is located, wherein the source identifier is associated with a source of content to be delivered to a destination server computer; and identifying the network traffic as a denial of service (DoS) attack and rate limiting the network traffic associated with the source identifier.

8. The method of claim 7, wherein the rate limiting includes blocking the network traffic.

9. The method of claim 7, wherein the source identifier includes a prefix of a network address and the known source identifiers are known prefixes and the comparison includes comparing the prefix of the network address against the known prefixes.

10. The method of claim 7, further including determining an amount of the rate limiting by checking a configuration file including a rate limiting parameter controlled by an entity associated with a destination address of the network traffic or controlled by a networking service associated with the POP.

11. The method of claim 10, wherein the configuration file includes different rate limiting parameters for different destination addresses.

12. The method of claim 7, wherein the POP edge location is one of multiple POP edge locations that are included in an anycast networking service.

13. The method of claim 7, further including:

capturing history data for source identifiers and geographic regions associated with the source identifiers;

transmitting the captured history data to the POP edge location; and storing the captured history data at the POP edge location and using the stored captured history data to perform the comparing of the source identifier to the known source identifiers.

14. The method of claim 7, wherein the same geographic region is one of the following: a same city, a same country, a same group of countries, a same continent, or a physical distance between the POP and a source computer associated with the source identifier or a networking distance between the POP and the source computer.

15. The method of claim 7, wherein the receiving of the network traffic is accomplished using Transmission Control Protocol (TCP), User Datagram Protocol (UDP), or Internet Control Message Protocol (ICMP).

16. A system of identifying and mitigating a denial of service (DoS) attack, comprising:

a plurality of a Point-of-Presence (POP) edge locations of a network, wherein the POP edge locations are located in different geographic regions, wherein a first of the POP edge locations includes a controller and a storage device storing instructions executable by the controller to:

receive network traffic from a source identifier in the first POP edge location, wherein the source identifier is associated with a server computer that supplies content and the network traffic is content to be supplied to a destination server computer;

compare the source identifier to stored source identifiers known to be from a same geographic region as a geographic region of the first POP edge location; and as a result of determining that the source identifier does not match any of the stored source identifiers based on the source identifier being associated with a different geographic region than the geographic region of the first POP edge location, identify the network traffic as a denial of service (DoS) attack and rate limit the network traffic associated with the source identifier.

17. The system of claim 16, wherein the source identifier includes a prefix of a network address and the stored source identifiers are known prefixes and the determining includes comparing the prefix of the network address against prefixes of the stored source identifiers.

18. The system of claim 16, wherein the first POP edge location is one of multiple POP edge locations that are included in an anycast service provider network.

19. The system of claim 16, wherein the rate limiting is controlled by a networking service or an entity associated with a destination of the network traffic through a configuration file stored at the first POP edge location.

20. The system of claim 16, wherein the receiving of the network traffic is accomplished using Transmission Control Protocol (TCP), User Datagram Protocol (UDP), or Internet Control Message Protocol (ICMP).

\* \* \* \* \*